June 20, 1967 J. T. BOLLJAHN ETAL 3,327,255
INTERDIGITAL BAND-PASS FILTERS
Filed March 6, 1963 2 Sheets-Sheet 1

INVENTORS
George L. Matthaei
John T. Bolljahn, deceased
by Harriette M. Bolljahn, Administratrix BY Julian C. Keppler

ATTORNEY.

June 20, 1967 J. T. BOLLJAHN ETAL 3,327,255
INTERDIGITAL BAND-PASS FILTERS
Filed March 6, 1963 2 Sheets-Sheet 2

INVENTORS
George L. Matthaei
John T. Bolljahn, deceased
by Harriette M. Bolljahn, Administratrix
BY Julian C. Keppler
ATTORNEY

United States Patent Office 3,327,255
Patented June 20, 1967

3,327,255
INTERDIGITAL BAND-PASS FILTERS
John T. Bolljahn, deceased, late of Palo Alto, Calif., by Harriette Bolljahn, executrix, Palo Alto, Calif., and George L. Matthaei, Menlo Park, Calif., assignors to the United States of America as represented by the Secretary of the Army
Filed Mar. 6, 1963, Ser. No. 263,363
9 Claims. (Cl. 333—73)

This invention relates to microwave band-pass filters and more particularly to a strip-line interdigital type band-pass filter.

While interdigital line structures have in the past been regarded as of interest for use in slow-wave structures, their useful properties as band-pass filters at microwave frequencies has generally been overlooked. It is a specific object of the present invention to provide an interdigital microwave band-pass filter having strong stop-bands and which are free of spurious responses.

It is another object of the present invention to provide an interdigital microwave band-pass filter which is compact and has relatively non-critical manufacturing tolerance.

It is still another object of the present invention to provide an interdigital microwave band-pass filter capable of operating over wide-band widths such as on octave, moderate or narrow bandwidths.

In accordance with one embodiment of the present invention there is provided a microwave filter which includes a pair of spaced parallel ground planes and spaced parallel metallic blocks intermediate the ground planes and in electrical contact therewith. Included further is an interdigital transmission line comprising two interleaving sets of parallel arranged metallic bars. One set of bars are affixed to the first of the metallic blocks and extend towards the second block but terminate short thereof. The other set of bars are affixed to the second metallic block and extend towards the first metallic block but terminate short thereof. Each of the metallic bars is made an electrical one-quarter wavelength of the mid-band frequency of the frequency band-pass of the filter. Also included are respective microwave energy coupling means which comprise respective metallic bars at both ends of the interdigital line and are coplanar therewith. One of the coupling bars has one end connected to the metallic blocks so that it is lined up with one set of parallel bars comprising the interdigital line and the second coupling bar has one end connected to the second metallic block so that it is lined up with the other set of parallel bars. Respective coaxial lines have their center conductors extend through respective metallic blocks to couple to respective energy coupling bars at the free ends thereof. The blocks are spaced exactly one-quarter wavelength of the mid-band frequency.

In accordance with another embodiment of the invention, there is provided a microwave filter which includes a pair of parallel spaced ground planes and spaced parallel metallic blocks intermediate the ground planes and in electrical contact therewith. Included also is an interdigital line comprising two interleaving sets of parallel arranged bars. One set of bars, except for the last bar thereof, are affixed to the first of the metallic blocks. The other set of bars, except for the first one thereof, are affixed to the second of the metallic blocks. All of the parallel arranged bars of the one set extend towards the second block but terminate short thereof. All of the second set parallel arranged bars extend towards the first metallic block but terminate short thereof. The last bar of the one set of parallel bars and the first bar of the second set of parallel bars are at opposite ends of the interdigital line, and each set of metallic bars are an electrical one-quarter wavelength of the mid-band frequency of the frequency band-pass of the filter. Also included are discrete microwave coaxial coupling means extending through the respective metallic blocks and having their respective center conductors in coupling relation with said first and last bars, respectively.

For a better understanding of the invention, together with other and further objects thereof, reference is had to the following description taken in connection with the accompanying drawing in which.

Figure 1:
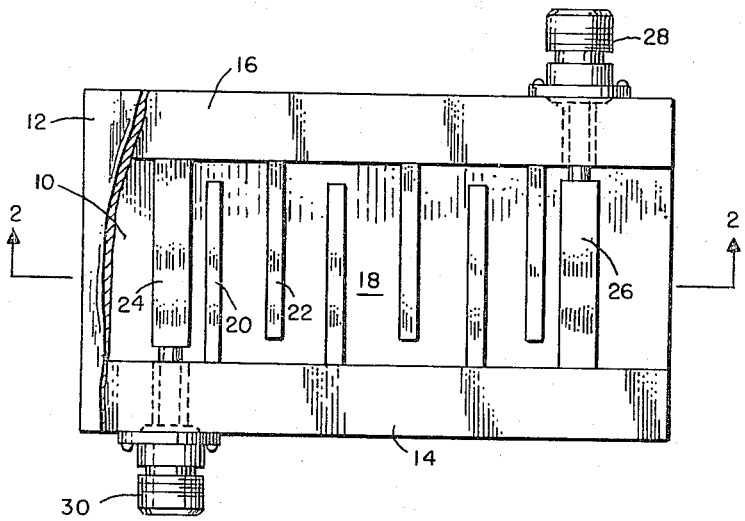
FIG. 1 is a side elevation of the strip-line microwave band-pass filter with one ground conducting plane partially torn away.
Figure 2:
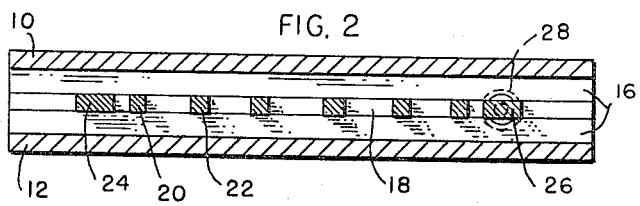
FIG. 2 is a cross section taken along lines 2—2 of FIG. 1.

Referring now to FIG. 1, there is shown at 10 and 12 a pair of spaced parallel ground planes hereinafter referred to as upper and lower ground planes, respectively. Parallel arranged metallic spacer and short circuiting blocks 14 and 16 are provided intermediate the ground planes 10 and 12 and are in electrical contact therewith. As hereinafter described, blocks 14 and 16 function as short circuiting elements. Centrally positioned intermediate upper and lower ground planes 10 and 12 midway therebetween is an interdigital line 18. As shown, the interdigital line 18 comprises one set of spaced metallic bars 20 which extend from block 14 towards block 16, and a second set of spaced metallic bars 22 which extend from block 16 towards block 14 and interleave with the bars 20. Each of the metallic bars 20 and 22 are made an electrical one-quarter wavelength long at the mid-band frequency of the frequency band-pass of the filter and are arranged such that the bars 20 are terminated short of block 16 and the bars 22 are terminated short of block 14. Thus the respective bars 20 are short circuited at one end by block 14 and are open circuited at the other end. Similarly, the respective bars 22 are short circuited at one end by block 16 and are open circuited at the other end. With such an arrangement the interdigital line 18 comprises a TEM mode strip-line resonator between parallel ground planes 10 and 12. Because of the capacitance between the open circuit ends of the resonator bars 20 and 22 and the short circuiting blocks 14 and 16, these resonator elements are made slightly shorter than one-quarter wavelength of the mid-band frequency and the short circuiting side walls comprised of the blocks 14 and 16 are spaced exactly a quarter wavelength apart at the mid-band frequency. Respective input and output coupling metallic bars 24 and 26 extend from respective blocks 14 and 16 so that each output coupling bar is shorted at one end. As shown, the respective input and output coupling bars 24 and 26 are at opposite ends of the strip-line comprising interdigital line 18, spaced therefrom, and co-planar therewith. The respective free end of input and output coupling bars 24 and 26 are coupled to and terminated by conventional coaxial type connectors 28 and 30. In the structure of FIG. 1, each bar element of the interdigital line 18 serves as a strip-line resonator, except for the input and output bar elements 24 and 26 which have an impedance matching function.

In FIG. 1, coupling is achieved by way of the fields fringing between adjacent resonator elements. For a given desired band-pass the number of resonator elements and the filter structural dimensions may be readily calculated in accordance with design procedures set forth in the November 1962 issue of the I.R.E. Transaction on Microwave Theory and Techniques, pages 479–490.

Generally, the microwave filter may be designed along the following lines. The ground conducting planes cannot be separated by more than one-half wavelength which corresponds to the highest frequency in the upper stop-band which is approximately three times the mid-band frequency. The width of the resonator bars forming the interdigital line is a function of the spacing between the ground planes. The bandwidth is a function of the spacing between the resonator bars comprising the interdigital line. The mid-band frequency is a function of the length of the resonator bars. The selectivity of the filter is a function of the number of resonator bars and it may be assumed that the fringing field couples from one resonator bar to the other in accordance with the theory set forth by W. J. Getsinger in I.R.E. Transaction on Microwave Theory and Techniques, January 1962, pages 63–72.

Figure 4:
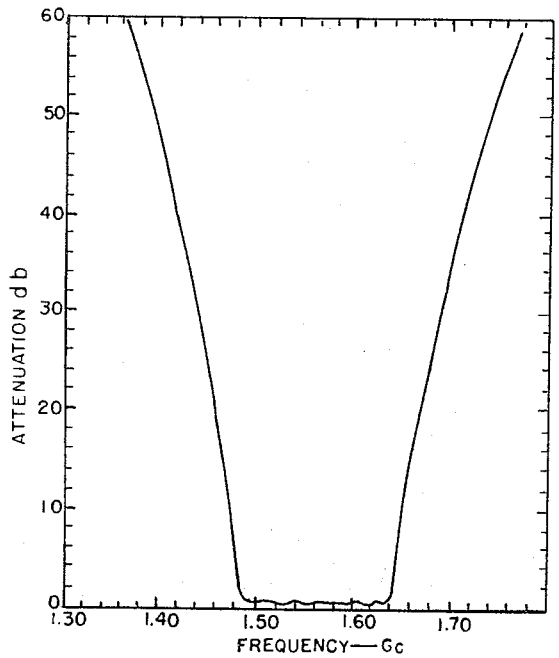
FIGS. 4 and 5 are curves illustrating the measured attenuation characteristics of the filters shown in FIGS. 1 and 3, respectively.

FIG. 4 is a curve showing the measured attenuation characteristic of a filter constructed in accordance with FIG. 1 and designed with six strip-line resonator elements resonant at a mid-band frequency of 1.5 gc. Such a filter is of narrow to moderate bandwidth, i.e., 30 percent bandwidth or less.

Figure 3:
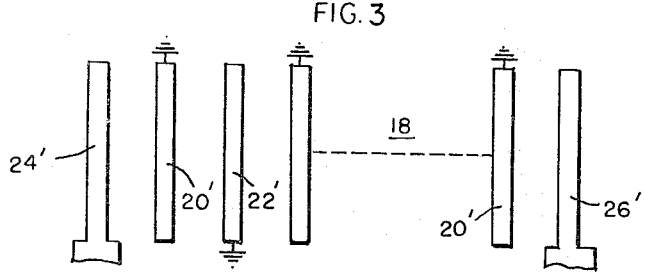
FIG. 3 is a schematic representation of another embodiment of the present invention.
Figure 5:
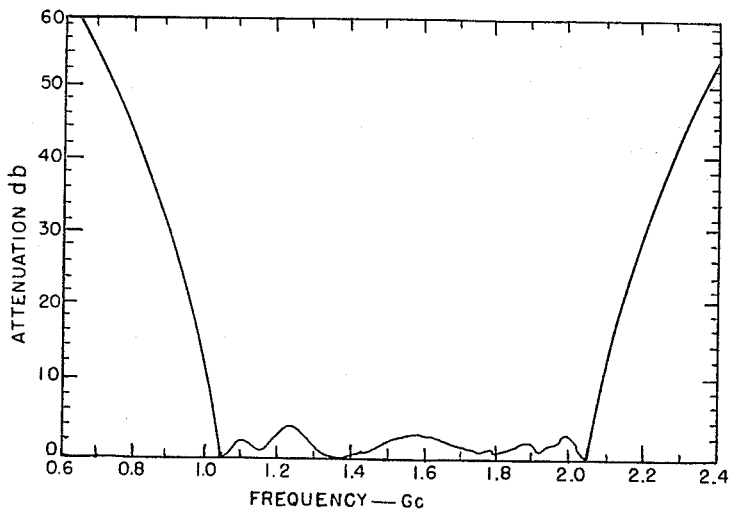

FIG. 3 is a schematic representation of another interdigital type filter which differs structurally from that shown in FIG. 1 only in that the line terminating input and output coupling bars 24' and 26' are open circuited instead of short circuited. Thus in the filter illustrated in FIG. 3 the open circuited terminating coupling bars as well as the interdigital line elements serve as strip-line resonators. It is to be understood, that in the filter of FIG. 3, the line terminating coupling bars 24' and 26' are connected to center conductors of respective input and output coaxial lines. The measured attenuation characteristics of this type filter with six resonator elements and dimensioned structurally in accordance with the afore-mentioned I.R.E. publication is shown in FIG. 5. Here again the mid-band frequency is 1.5 gc. This type filter is of moderate to wide bandwidth, i.e., around 30 percent bandwidth or greater.

In the filters above described it is to be understood that the strip-line resonator elements may be in the form of round rods or bars rectangular in cross section without affecting the band-pass filter action.

Figure 6:
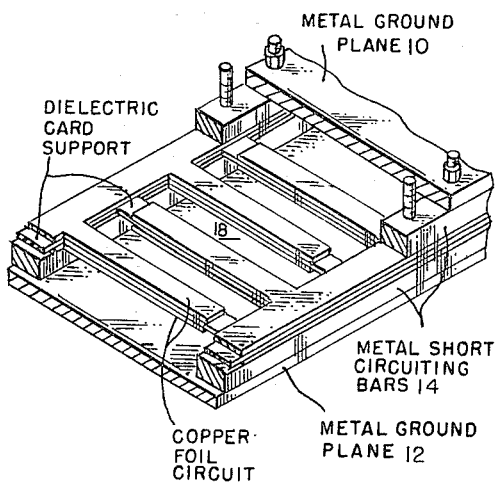
FIG. 6 is an isomeric view, partially in cross section, of a strip-line filter in accordance with the present invention wherein the interdigital line is fabricated by a photo-etching process.

Also, it is to be understood that the strip-line resonators comprising the interdigital structure may be fabricated by photo-etching the interdigital line on a copper-clad dielectric card and the dielectric material removed from the region between the copper foil lines. In order to provide good support for the lines, the dielectric is not removed at the open-circuit ends of the strip-line resonators. This type filter is shown in FIG. 6.

The advantages of the interdigital band-pass filters hereabove described over the band-pass filters previously known in the art may be summed up as follows:

(1) They are compact.

(2) The tolerances required in their manufacture are relatively relaxed as a result of the relatively large spacings between resonator elements.

(3) The second band-pass is centered at three times the center frequency of the first band-pass, and there is no possibility of spurious responses in between.

(4) The rates of cutoff and the strength of the stop bands are enhanced by multiple-order poles of attenuation at D.C. and at even multiples of the center frequency of the first pass-band.

(5) These filters can be fabricated in structural forms which are self-supporting so that dielectric material need not be used. Thus dielectric loss can be eliminated.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A strip-line microwave filter adapted to pass a prescribed band of frequencies comprising a pair of spaced parallel ground planes, spaced parallel metallic blocks intermediate said ground planes and in electrical contact therewith, an interdigital line comprising two interleaving sets of parallel arranged metallic bars, one set of said bars being affixed to one of said metallic blocks and extending towards the other metallic block but terminating short of said other block, the other set of said bars being affixed to said other metallic block and extending towards said one metallic block but terminating short thereof, each of said metallic bars being an electrical one-quarter wavelength of the mid-band frequency of said band-pass, and discrete microwave energy coupling means at respective ends of said interdigital line.

2. The filter in accordance with claim 1 wherein said metallic blocks are spaced exactly one-quarter wavelength of the mid-band frequency of said band-pass.

3. The filter in accordance with claim 1 wherein the interdigital line is parallel to and equally spaced from said ground planes, and said microwave energy coupling means is coextensive with said interdigital line.

4. The filter in accordance with claim 1 wherein the respective microwave energy coupling means comprises respective metallic bars at both ends of said interdigital line and coplanar therewith, one of said bars having one end connected to said one metallic block and the other of said bars having one end connected to the other of said metallic blocks, and respective coaxial lines having their center conductors extending through said metallic blocks to couple to said respective energy coupling bars at the free ends thereof.

5. A strip-line microwave filter adapted to pass a prescribed band of frequencies comprising a pair of spaced parallel ground planes, an interdigital metallic line positioned intermediate said ground planes and parallel thereto, said interdigital line comprising one set of parallel arranged bars having corresponding ends connected in common to said ground planes and a second set of parallel arranged bars interleaving with said one set of bars, said second set of parallel arranged bars having corresponding ends connected in common to said ground planes, the remaining ends of said interleaving bars being open circuited, the interleaving bars comprising said interdigital line being an electrical one-quarter wavelength of the mid-band frequency of said band-pass, and discrete microwave energy coupling means at respective ends of said interdigital line and aligned therewith.

6. A microwave band-pass filter adapted to pass a prescribed band of frequencies comprising a pair of spaced parallel arranged ground planes, spaced parallel metallic blocks interconnecting said ground planes, an interdigital line comprising a set of two interleaving strip-line bar resonators intermediate said parallel metallic blocks and spaced equally from said ground planes, one set of said bar resonators having corresponding ends depending from one of said metallic blocks and the other set of said bar resonators having corresponding ends depending from the other of said metallic blocks, the remaining ends of said resonators being open circuited, and discrete microwave energy coupling means at opposite ends of said interdigital line.

7. A strip-line microwave filter adapted to pass a prescribed band of frequencies comprising a pair of spaced parallel ground planes, spaced parallel metallic blocks intermediate said ground planes and in electrical contact therewith, an interdigital line comprising two interleaving sets of parallel arranged bars, one set of said bars, except for the last bar thereof, being affixed to one of said metallic blocks, all of said one set bars extending towards the other metallic block but terminating short of said other block, the other set of bars, except for the first bar thereof, being affixed to said other metallic block, all said other set bars extending towards said one metallic block but terminating short thereof, said first and last bars being at opposite ends of the interdigital line, each of said metallic bars being an electrical one-quarter wavelength of the mid-band frequency of said band-pass, and discrete microwave coaxial coupling means extending through respective metallic blocks and having their respective center conductors in coupling relation with said first and last bars, respectively.

8. The filter in accordance with claim 7 wherein said metallic blocks are spaced exactly one-quarter wavelength of the mid-band frequency of said band-pass.

9. The filter in accordance with claim 7 wherein said interdigital line is parallel to and equally spaced from said ground planes.

References Cited
UNITED STATES PATENTS

| | | | |
|---|---|---|---|
| 2,800,604 | 7/1957 | Beaver | 315—3.5 |
| 2,819,452 | 1/1958 | Arditi | 333—73 |
| 2,915,716 | 12/1959 | Hattersly | 333—73 |
| 2,922,123 | 1/1960 | Cohn | 333—10 |
| 2,945,195 | 7/1960 | Matthei | 333—73 |
| 3,069,587 | 12/1962 | Dench | 315—3.5 |
| 3,104,362 | 9/1963 | Matthei | 333—84 |

HERMAN KARL SAALBACH, *Primary Examiner.*

ELI LIEBERMAN, *Examiner.*

C. BARAFF, *Assistant Examiner.*